US006016129A

United States Patent [19]

Lauper

[11] Patent Number: 6,016,129

[45] Date of Patent: Jan. 18, 2000

[54] ANTENNA SYSTEM, IN PARTICULAR AN ANTENNA SYSTEM FOR TRAFFIC COMMUNICATING SYSTEMS

[75] Inventor: Alfred Lauper, Zürich, Switzerland

[73] Assignee: Siemens Schweiz AG, Zurich, Switzerland

[21] Appl. No.: 08/930,607

[22] PCT Filed: Apr. 11, 1996

[86] PCT No.: PCT/CH96/00128

§ 371 Date: Oct. 14, 1997

§ 102(e) Date: Oct. 14, 1997

[87] PCT Pub. No.: WO96/32755

PCT Pub. Date: Oct. 17, 1996

[30] Foreign Application Priority Data

| | | | |
|---|---|---|---|
| Apr. 12, 1995 | [CH] | Switzerland | 1055/95 |
| May 17, 1995 | [CH] | Switzerland | 1443/95 |
| Aug. 29, 1995 | [CH] | Switzerland | 2450/95 |

[51] Int. Cl.[7] .......... H01Q 21/00; H01Q 1/32; H01Q 11/12

[52] U.S. Cl. .......... 343/867; 343/711; 343/717; 343/744

[58] Field of Search .......... 343/711, 712, 343/713, 742, 744, 867, 717; 455/41, 274

[56] References Cited

U.S. PATENT DOCUMENTS

| | | | |
|---|---|---|---|
| 3,527,897 | 9/1970 | Sugi et al. | 455/41 |
| 3,731,314 | 5/1973 | Hafner | 434/717 |
| 3,984,073 | 10/1976 | Woods et al. | 246/34 R |
| 5,012,236 | 4/1991 | Troyk et al. | 340/825.54 |
| 5,084,699 | 1/1992 | Demichele | 340/825.54 |
| 5,095,309 | 3/1992 | Troyk et al. | 340/825.54 |
| 5,198,807 | 3/1993 | Troyk et al. | 340/825.54 |

FOREIGN PATENT DOCUMENTS

| | | |
|---|---|---|
| 0502337 | 9/1992 | European Pat. Off. . |
| 2835241 | 2/1980 | Germany . |
| 2914485 | 10/1980 | Germany . |
| 63-301167 | 12/1988 | Japan . |
| 9202158 | 7/1994 | Netherlands . |

OTHER PUBLICATIONS

*The Electrical Engineering Handbook*, C. Dorf (ed), CRC Press Inc.,, Boca Raton, FL, Chapter 36.1, pp. 861–865, 1993.

Dobrinski et al., *Physik Für Ingenieure* [*Physics for Engineers*], B.G. Teubner, Stuttgart, 4th Edition, Chapter 5.1.8.2, pp. 316–317, 1976.

Motorola Technical Developments, vol. 17, Dec. 1992, Schamburg, Illinois, pp. 142–144: Cook, "Novel Applications of Radiating Feeder."

Funkshau, vol. 47, No. 13, 1975, Munich, pp. 66–68, Bretting: "Abstrahlende Hochfrequenzleitung zur Bahnsteig–Überwachung."

Patent Abstracts of Japan, vol. 13, No. 133, published Apr. 14, 1989.

*Primary Examiner*—Hoanganh Le
*Assistant Examiner*—Jennifer H. Malos
*Attorney, Agent, or Firm*—Greenblum & Bernstein, P.L.C.

[57] ABSTRACT

Antenna system including a first antenna which is connected to a first transmit and/or receive unit and which has a natural frequency of at least approximately the value fm. The system also includes a second antenna which is linked both inductively and mechanically to the first antenna and which has a natural frequency of at least approximately the value fm. The first and second antennae are designed to be linked to another antenna system with at least a third antenna which has a natural frequency of at least approximately the value fm and which is connected to a second transmit and/or receive unit intended for the transmission of data to and/or reception of data from the first transmit and/or receive unit. At least one transmit and/or receive unit, either of the first or the second transmit and/or receive unit, is located at a route point on a public thoroughfare. The other transmit and/or receive unit is located on a vehicle driving on the public thoroughfare. The antenna system proposed enables a broad-band transmission channel to be made available with only low attenuation.

21 Claims, 5 Drawing Sheets

Ca1
T/R1
A1
Ca2
La1
A2
d12
f12
La2
d23
f23
Ca3
T/R2
A3
La3

AS3
AS12
La23
La12
Rq
Ca3
Ra3
La3
Ca2
Ra2
La2
Ca1
Ra1
La1
Rl

Ca1
T/R1
A1
La1
d12
f12
La2
d23
A2
f23
Ca3
T/R2
Ca2
A3
La3

Ca1
T/R1
A1
La1
d12
f12
d23
La2
A2
KS3
Ca3
T/R2
Ca2
f23
A3
La3

ANTENNA SYSTEM, IN PARTICULAR AN ANTENNA SYSTEM FOR TRAFFIC COMMUNICATING SYSTEMS

BACKGROUND OF THE INVENTION

1. Field of the Invention

The present invention relates to an antenna system used in traffic communication systems.

2. Discussion of Background Information

The present application claims priority under 35 U.S.C. §119 of Patent Application No. 1055/95-6, filed in Switzerland on Apr. 12, 1995.

Antennas basically perform the task of transformation quadripoles, which cause the adaptation between the wave impedance of the antenna lead and the wave impedance of the free space and which transform an electrical oscillation transmitted through the antenna lead into an electromagnetic wave. In this case the antenna acts as a resonator. The equivalent circuit of a loss-free antenna operated in resonance only consists of its radiation resistance. According to C. Dorf in "The Electrical Engineering Handbook", CRC Press Inc., Boca Raton, Fla., 1993, chapter 36.1, page 864, this radiation resistance for a dipole, which can be determined by the calculation of the electrical and magnetic fields E, H, is approximately 73 Ohm. It is furthermore described at a different place that the effective length of a dipole can be increased by increasing the end capacity of the dipole (end loading). By means of this it is therefore possible to tune a relatively short dipole to signals of greater wavelength. For example, an antenna A3 is represented in FIG. 1, whose effective length was increased by connecting a capacitor Ca3. The wire connecting the terminals of the capacitor Ca3 with each other therefore acts as an inductivity and is schematically identified as the coil La3. It is known that maximal opposite phase voltages occur at the ends of the dipole (capacitive zone), and maximal current between these ends in the inductive zone or in the coil La3. For transmitting data between two transmitter stations, their antennas can be coupled, for example via the magnetic field. In FIG. 1, the antenna A3 is coupled in this way with an antenna A2 of the same kind. Therefore a current in the coil La3 causes a magnetic field, by means of which a current is induced in the coil La2 of the antenna A2. The distance between the antennas La2 and La3 is preferably selected to be less than the wavelength of the transmitted signals. Losses, which are created if electrical fields must pass through strong damping layers, are prevented in this way.

The antennas A2, A3, the source impedance Rq in the transmitter and the balance resistor Rl in the receiver are appropriately matched for the transmission of signals of a maximal signal strength. Because of this it is possible to transmit signals of a high voltage level to the antenna A2. But in this case the antennas A2 and A3 act as narrow-band resonant circuits which only permit signals from a narrow frequency range to pass. But often a greater bandwidth is required for information channels in which increased amounts of data are to be transmitted. The bandwidths can be increased, for example by damping the resonant circuits. However, this also affects the damping behavior of the transmission channel, so that it is necessary, because of the increase in bandwidth of the transmission channel, to tolerate greater signal damping. This damping is correspondingly higher if the bandwidths are large with respect to the transmission frequency or to the center frequency fm in the resonant circuits. The bandwidth of 1 MHz can probably still be satisfactory at a center frequency of 30 MHz, but with center frequencies below 10 MHz it can hardly be realized without the creation of increased transmission losses. To compensate the occurring losses it is therefore necessary to provide a correspondingly higher transmitting power.

However, with traffic engineering communications systems with ground-restricted and mobile communications units in particular, the permissible transmitter output is limited. It must furthermore be assumed that these systems will have increased bandwidth requirements in the future.

SUMMARY OF THE INVENTION

It is therefore an object of the invention to provide an antenna system which has a large bandwidth and only a low level of signal damping.

This object is attained by an antenna system having a first antenna connecting with at least one of a first transmitter and receiver unit which includes a second antenna inductively and mechanically coupled via the first antenna with at least one of the first transmitter or receiver unit. The manually inductively and mechanically coupled antenna being coupled with a further antenna system having at least one third antenna connected with at least one of the second transmitter and receiver unit for the transmission of and/or reception of data from one of the first transmitter and receiver unit. The first, second and third antennas having a resonant frequency of at least a predetermined value.

Another object of the present invention is to provide an antenna system wherein at least one of the first or second antennas is provided to be inductively coupled to the third antenna.

The antenna system also provides an arrangement wherein at least one of the first, second and third antenna have an inductivity in a shape of at least approximately an elongated electrical conductor having ends connected with a capacitance.

Another object of the present invention is to provide an antenna system wherein the inductivity and the capacitance is provided by one of individual and parallel placed wires, coaxial conductors and metal strips arranged on a plate.

A further object of the invention is to provide an antenna system wherein the third antenna is coupled to one of the first and second antennas via a coupling coil.

Another object of the present invention is to provide an antenna system in which the inductivities of the first and second antennas are approximately vertical with respect to each other.

Another object of the present invention is to provide an antenna system wherein distances between the inductivities are selected such that a passband curve of an oscillation system is formed by the first, second and third antennas so that a data transmission bandwidth is provided.

The antenna system of the present invention also includes an object of providing one of the first and second antennas and the third antenna which is adapted to be coupled to at least one further antenna so as to provide an increased bandwidth.

Another object of the present invention is to provide an antenna system wherein at least one of a transmitter and receiver unit is positioned at a point on a traffic route and a second one of a transmitter and receiver unit is positioned on a vehicle traveling over the traffic route.

Another object of the present invention is to provide an antenna system in which the inductivity of one of the first, second and third antenna is disposed above a preferably electrically conducting plate and a ferrite element is provided between the inductivity and the plate.

Another object of the present invention is to provide an antenna system in which one of the antennas is coupled with a rectifier unit for the current supply.

A further object of the present invention is to provide an antenna system in which at least one of the antennas is constituted by a coaxial line.

Another object of the present invention is to provide an antenna system in which the length of the coaxial line is selected so that an occurring resonant frequency corresponds at least approximately to a predetermined value.

An additional object of the present invention is to provide an antenna system wherein the coaxial line is shielded against effects of electrical fields.

Another object of the present invention is to provide an antenna system in which the coaxial line is divided into cable elements having shielding connected with ground so that the coaxial line is shielded against electrical fields so as to avoid impairment of the magnetic field.

An additional object of the present invention is to provide an antenna system wherein the third antenna is one of a line conductor and leak cable which preferably can be coupled to the antenna system formed by the first and second antennas.

Another object of the present invention is to provide an antenna system wherein the line conductor is arranged in a rail base of a railroad track or tracks.

Further objects of the present invention include providing the inductivities of the antennas in one horizontal plane and wherein the third antenna is adapted to be coupled to at least one further antenna so as to provide increased bandwidth.

When employed in traffic engineering communication systems, the antenna systems in accordance with the invention permit the dependable transmission of increased amounts of data. By means of the antenna system in accordance with the invention, it is possible to create a wide-band transmission channel which has only a low level of damping. The antenna system can be produced with a small outlay in a cost-effective manner and can be realized in a comparatively narrow space. Thus installation of the antenna system is also possible without problems, for example, in vehicles.

Furthermore, satisfactory interference rejection or a high signal-to-noise ratio with respect to external signals is achieved with the antenna system of the invention. Among other factors, the prevention, in accordance with the invention, of coupling losses is of great importance also in connection with the remote excitation of traffic engineering communications systems. This is particularly essential in communication units which are only briefly placed in operation for transmitting and receiving signals, for example, when a vehicle passes.

A further reduction of transmission losses is achieved in that the antennas of the antenna system are seated on a ferrite material and a metal plate is disposed underneath. Eddy currents are reduced by this arrangement and stable transmission conditions are achieved, which are largely independent of the installation location of the antenna system.

BRIEF DESCRIPTION OF THE DRAWINGS

The invention will be explained in detail below by means of the drawings. Shown are in:

FIGS. 1 and 1*a*, shows an antenna system in accordance with the invention, consisting of a first and a second antenna, to which a third antenna can be coupled.

FIG. 8*c* is a variation of the antenna system of FIG. 8*b;*

FIG. 8*d* is an equivalent circuit for the antenna system of FIG. 1*a* or FIG. 8*c;*

DETAILED DESCRIPTION OF THE PREFERRED EMBODIMENTS

Figure 1:
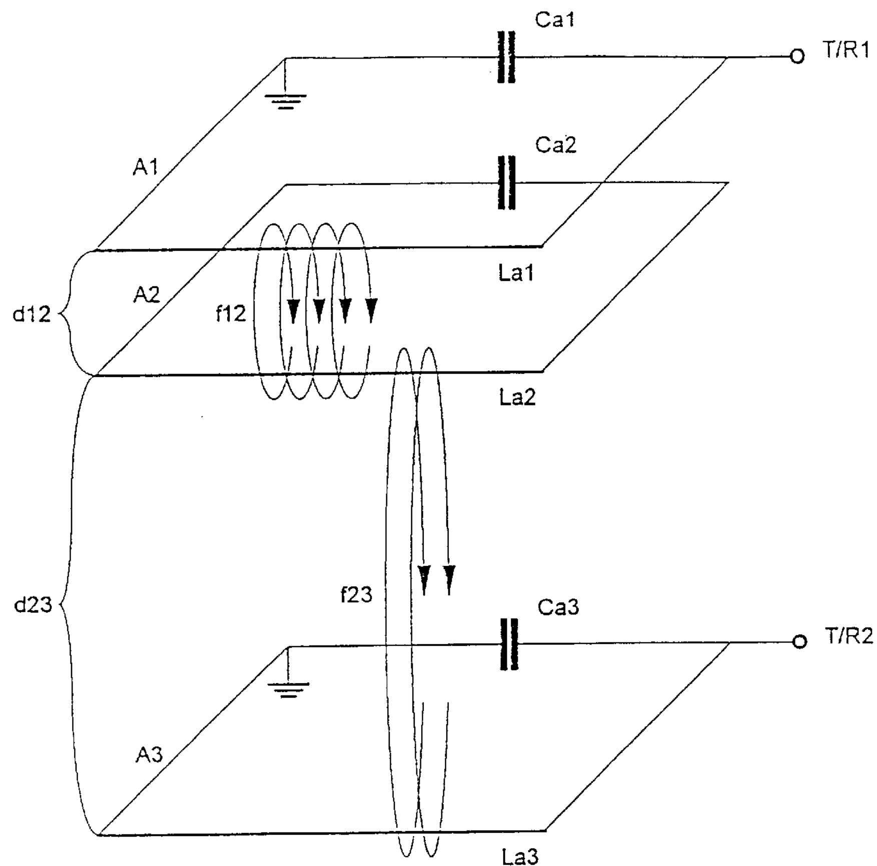
Figure 3:
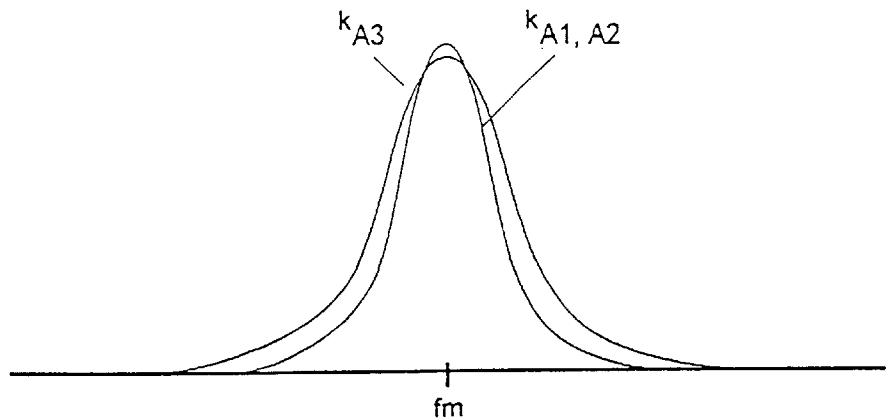

FIG. 1 shows an antenna system formed by two coupled together resonant circuits or antennas A1, A2, which have coils La1, La2 and capacitors Ca1, Ca2 connected with the coils La1, La2. The coils La1 and La2, which are formed, for example, by an extended wire, a coaxial line or a metal strip printed on a board (printed circuit board), have a mutual distance d12, by means of which a magnetic coupling is provided. It is thus possible to set the desired degree of coupling by changing the distance d12. The received signal can be picked up with maximum voltage via the capacitor Ca1 formed, for example, by parallel located metal strips, and can be supplied to a unit T/R1, which is used as a receiver or as transmitter and receiver. Both antennas are tuned with a narrow bandwidth to a signal with the frequency fm, which is transmitted by the previously described third antenna La3. Typical passband curves $k_{A1, A2, A3}$ of the antennas A1, A2, A3 tuned to the same frequency fm (center frequency of the transmitted signals) are shown in FIG. 3. The passband curves $k_{A1, A2}$ of the antennas A1 and A2 are superimposed on each other, while the curve $k_{A3}$ of the third antenna A3, for example, has a slightly greater passband range.

Figure 4:
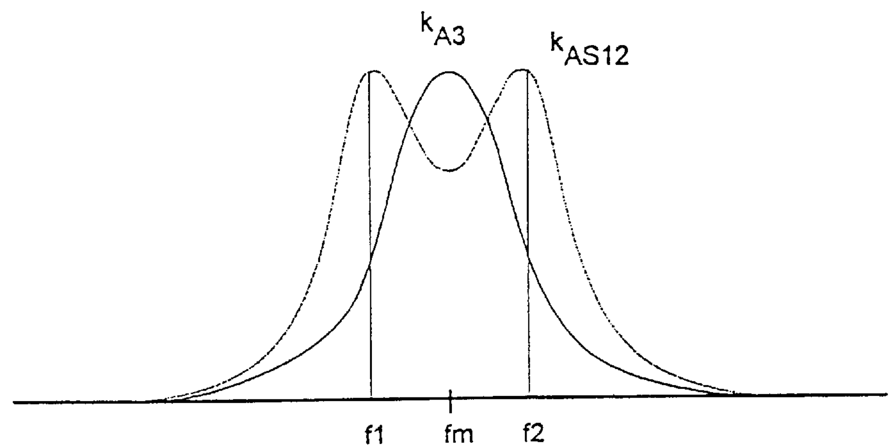
FIG. 4, depicts the passband curve of the antenna system formed by the coupled-together first and second antennas.
Figure 5:
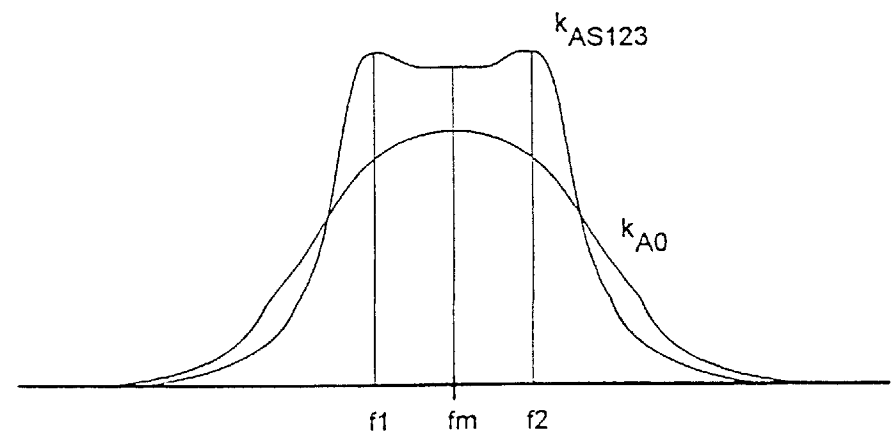
FIG. 5, depicts the passband curve of the antenna system formed by the coupled-together first, second and third antennas.

FIG. 4 shows that the coupled-together first and second antennas A1 and A2 form an oscillation system which has two distinct resonant frequencies f1, f2, which are all the less different from each other, the weaker the coupling between the first and second antennas A1, A2 is. The passband curve $k_{A12}$ of this oscillation system therefore corresponds to that of a bandpass filter. Coupled oscillation circuits, for example, from "Physik für Ingenieure" [Physics for Engineers] by Dobrinski, Krakau, Vogel, published by Teubner, Stuttgart 1976, 4th Edition, chapter 5.1.8.2. pages 316, 317, FIG. 316.1, have been used up to now in input or intermediate frequency stages of radio receivers.

By coupling the third antenna A3 to the oscillation system formed by the antennas A1 and A2, a system with three individual systems capable of oscillation and of the same resonant frequency fm is created, whose passband curve $k_{A123}$ approximately corresponds to a rectangle and has, in comparison with the passband curve $k_{AO}$ of a broadband oscillation circuit, clearly reduced damping in the passband area (approximately—15 dB).

Thus, the resultant passband curve $k_{A123}$ is determined by the quality of the individual systems and by the degree of mutual coupling or the selection of the distances d12 and d23.

Figure 2:
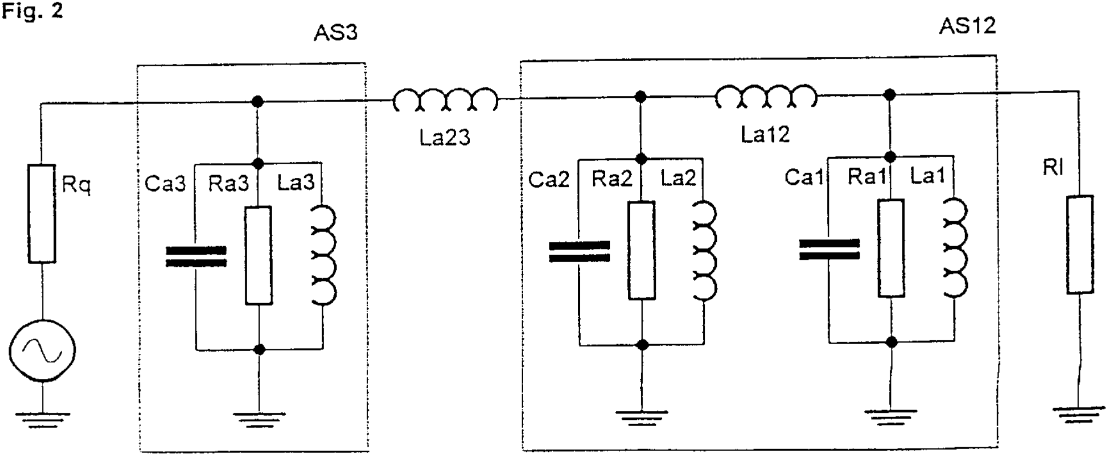
FIG. 2, depicts the electrical equivalent circuit diagram of the antenna system shown in FIG. 1, FIG. 3, shows the passband curves of the antennas shown in FIG. 1, which are not coupled to each other.

The equivalent circuit diagram of the oscillation system formed by the antennas A1, A2 and A3 with a source, source impedance Rq, ballast resistor Rl and loss resistors Ra1, Ra2 and Ra3 of the resonant circuits is represented in FIG. 2. Virtual equivalent inductances La12, La23 are also shown, which can be determined by calculations based on the selected coupling.

Figure 6A:
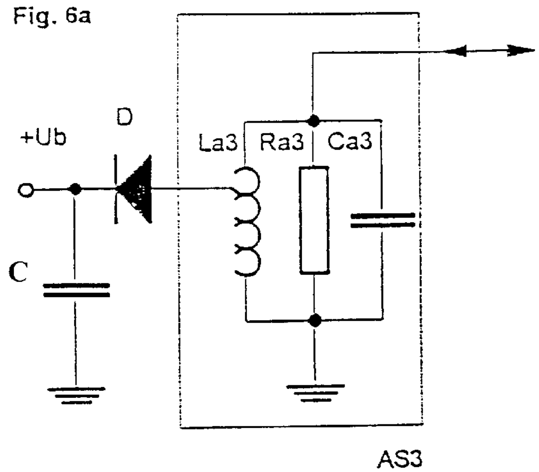
FIG. 6*a* shows a coupling circuit for coupling a transmitter/receiver unit to a pick-up coil.
Figure 6B:
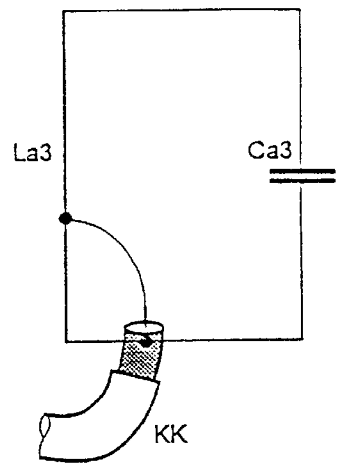
FIG. 6*b* shows a coaxial cable for providing the connection of FIG. 6*a;*
Figure 7A:
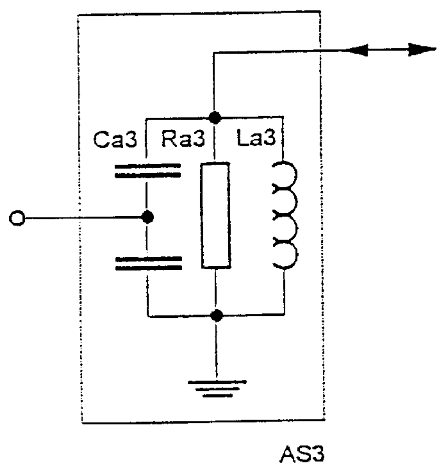
FIG. 7*a* shows how the capacitor Ca3 connection can be provided by a plurality of capacitors connected with each other.
Figure 7B:
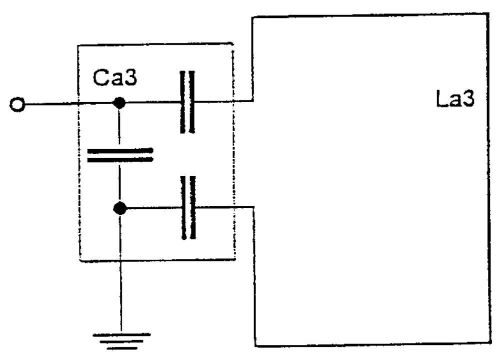
FIG. 7*b* is a variation of FIG. 7*a;*
Figure 8A:
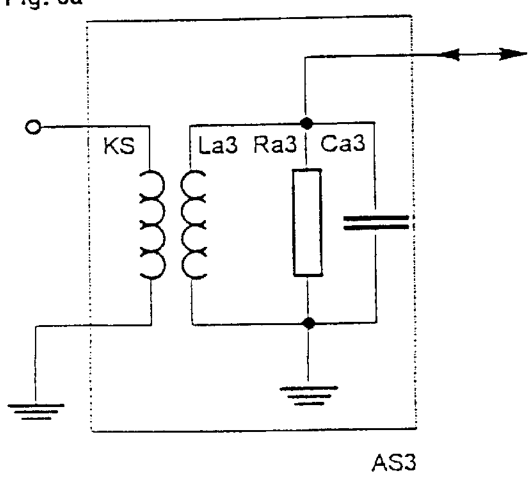
FIG. 8*a* shows a transmitter/receiver unit transformer—coupled, by a coupling coil, to an antenna.
Figure 8B:
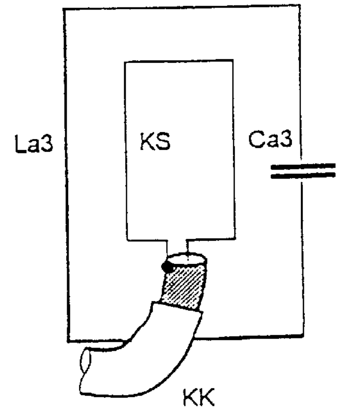
FIG. 8*b* shows a coaxial cable for providing the connection of FIG. 8*a;*

Possibilities for coupling the transmitter and receiver units T/R1, T/R2, or the rectifier units intended for current generation, to the antennas A1, A2, A3 are shown in FIGS. 6 to 8. FIG. 6*a* shows the coupling to a pick-up of the coil La3. FIG. 6*b* shows the practical application of the connection by use of a coaxial cable. It is shown in FIGS. 7*a* and 7*b*, that the capacitor Ca3 can be formed by means of individual capacitors connected with each other as well as with the transmitter and receiver units T/R1, T/R2. In FIGS. 8*a* and 8*b* it is shown that the transmitter and receiver units T/R1, T/R2 can also be transformer-coupled to the antennas A1, A2 and A3 via a coupling coil KS.

In FIG. 6*a*, a diode D, connected with a capacitor C, is coupled to the coil La3 for the current supply of a communications unit. The diode D yields a supply voltage +UB. Because of the reduction of coupling losses in accordance with the invention, a higher supply output is available in the remote-excited communications unit.

Figure 9:
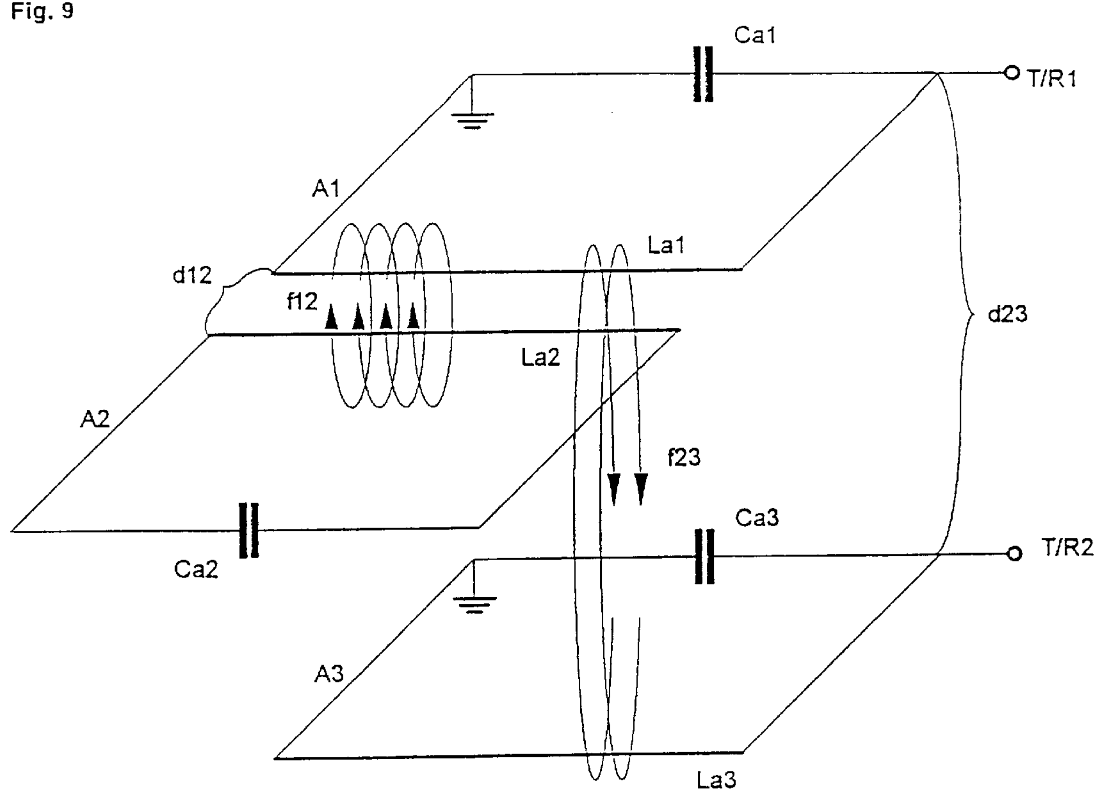
FIG. 9, shows an advantageous arrangement of the first and second antennas.

In FIG. 9, the first and second antennas A1, A2 are not disposed above each other as in FIG. 1, but in the same plane. This is advantageous in case a vehicle which is to be provided with a transmitter and receiver unit T/R has only a small ground clearance. Therefore, the transmitter and receiver unit T/R, along with the antenna system AS12 connected with T/R and arranged in one plane (see FIG. 2), can be installed without problems. However, in the arrangement shown in FIG. 1 as well as in the arrangement shown in FIG. 9, the first and second antennas A1, A2 are mechanically fixed with place in respect to each other, so that the provided coupling between these two antennas A1, A2 remains unchanged.

Figure 10:
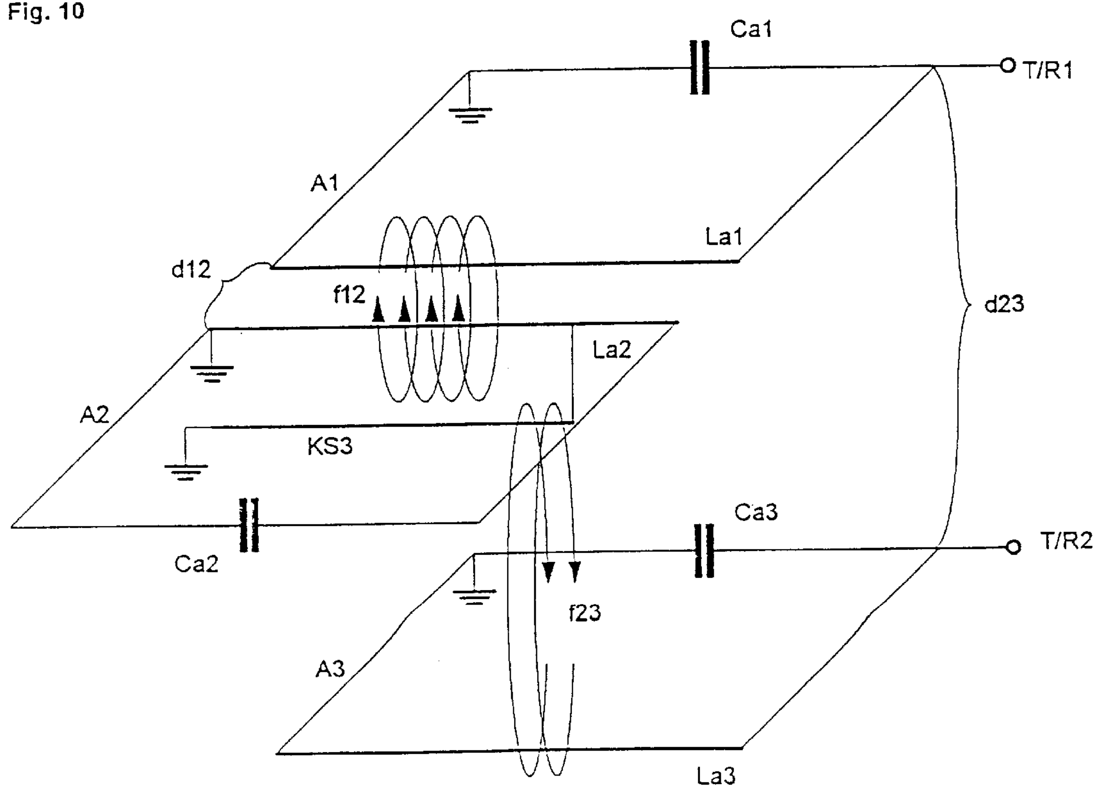
FIG. 10, a possibility of coupling the third antenna to the antenna system formed by the first and second antennas.

The coupling of the antenna A3 via a coupling coil KS3 to the antenna system AS12 disposed in one plane is shown in FIG. 10. The coupling coil KS3, which is inductively coupled with the coil La3 of the antenna A3 is connected, as shown in principle in FIG. 6, with a pick-up of the coil La2 of the antenna A2. Because of this arrangement, the antenna system AS12 can possibly be more advantageously placed. Furthermore, it is possible to set the desired degree of coupling between the antenna system AS12 and the antenna A3 in an even simpler way.

The use of the antenna system in accordance with the invention is seldom advantageously employed in radio technology, because the required bandwidth, particularly in the range of radio and TV frequencies, is practically always available, because sufficient transmitting power is available and because the antennas of the system can be stably installed. In contrast thereto, it is possible by to use the antenna system in accordance with the invention to clearly improve transmission systems in connection with traffic engineering, which in the future will be provided for transmitting high data rates and which operate with relatively low transmitting power and low frequencies of 1 MHz to approximately 50 MHz.

As was already described above, the employment of the antenna system in accordance with the invention yields particular advantages if individual communications units must be remotely excited. A higher supply output is therefore available at the receiving end because of the reduction of coupling losses, or the transmitting power can be correspondingly reduced. Furthermore, the distance between the levels of the useful and interference signals is advantageously increased because of the measures taken in accordance with the invention.

Figure 11:
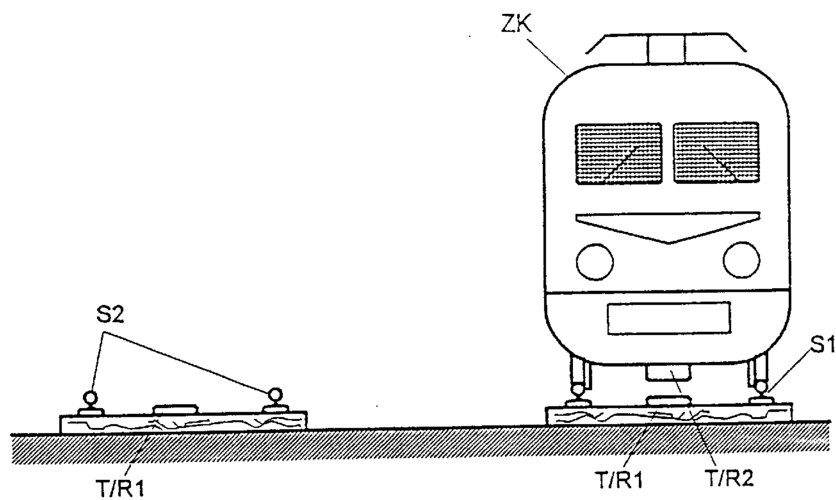
FIG. 11, shows the use of the antenna system in accordance with the invention in traffic engineering.

FIG. 11 shows two pairs of rails S1, S2, which run next to each other. A train ZK, provided with a mobile transmitter and receiver unit T/R2 runs on the rails S1. Ground-restricted transmitter and receiver units T/R1, which are intended for a data exchange with the vehicles ZK running on the rails S1, S2, are provided between the rails S1, S2. In actual applications, information is often only transmitted from the ground-restricted units T/R1 to the mobile transmitter and receiver units T/R. However, bidirectional data transmission is also possible. Since the vehicles move at speeds up to several hundred km/h, only short contact times of a few milliseconds are generated between the ground-restricted and mobile transmitter and receiver units T/R. Furthermore, soiling as well as ice and snow must be expected. In addition, only systems with relatively low transmitting power are approved by the national licensing authorities.

In order to be able to transmit the desired data by means of low frequencies in the range of a few MHz (short wave range), with a large bandwidth and low transmitting power, the contact time, in which the transmitter and receiver units T/R1 and T/R2 can exchange information, is increased by means of the measures in accordance with the invention. For this purpose, the path attenuation is reduced in accordance with the invention, because of which the transmitter and receiver units T/R1 and T/R2 can come into transmitting/receiving contact earlier.

Figure 12:
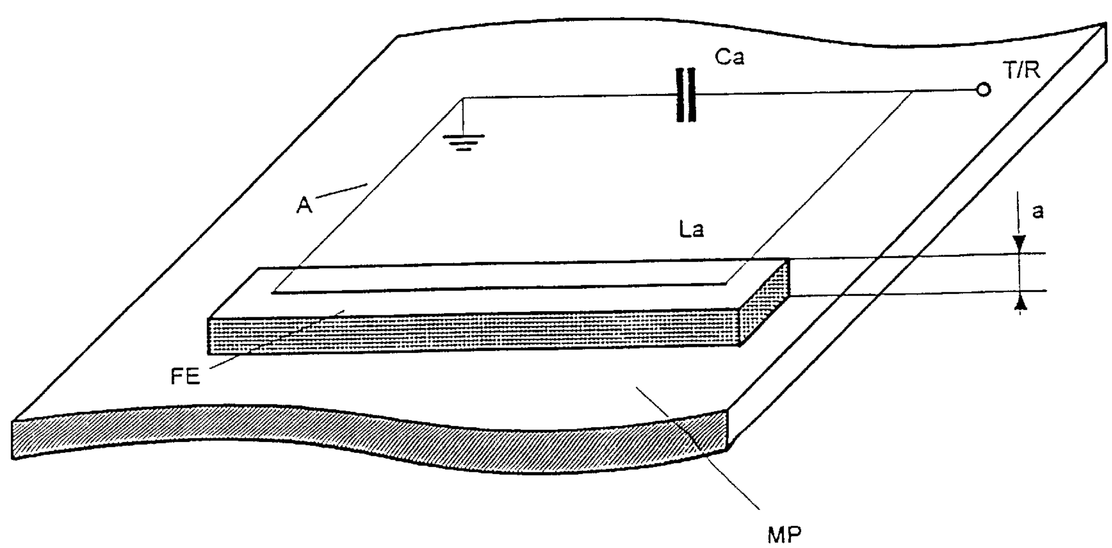
FIG. 12, shows an antenna mounted in a preferred manner on a plate.

The measures shown in FIG. 12 can be employed especially advantageously, particularly in connection with the antenna system in accordance with the invention. In order to shield the antenna A against the effects in the area where it is installed, the antenna A is preferably disposed at a distance of a few centimeters on an electrically conducting plate MP. However, eddy currents which generate additional transmission losses can be generated in this plate MP during reception or the generation of magnetic fields. In accordance with the invention, to prevent these transmission losses, a ferrite element FE is therefore provided between the plate MP and in particular the inductive element L of the antenna A, which binds the lines of force f12 or f23, so that they cannot enter the plate MP. The height a of the ferrite element FE is correspondingly selected. This measure in accordance with the invention can also be advantageously employed if a non-conducting material is used for the plate MP. In this case, too, it is possible to increase the coupling between the first and second antennas A1, A2 and the third antenna A3. Sturdy, non-brittle ferrite elements FE are preferably used, which are made of plastic in which a high number of ferrite particles are enclosed.

In FIG. 1*a*, the antenna A2 is formed by a coaxial cable which, for the purpose of shielding, is preferably divided into several cable elements KK, each one of which is connected with ground via the shielding. Electrical fields are shielded by this step; but magnetic fields are not impeded. The length of the coaxial cable formed by the cable element KK is normally selected to be corresponding to one or one quarter of the wavelength of the signals to be transmitted. If shielding against electrical fields is not required, a coaxial cable made of one piece can be employed, whose shielding is not connected to ground. Both antennas A1 and A3 are preferably realized by one line (preferably a coaxial cable) and shielded against the effects of electrical fields. The antenna (or the oscillation circuit) A1 and/or also the antenna A2 can be produced simply by employing a coaxial cable. Furthermore, defects are prevented, which can be caused by damage to the capacitor or soldered connections.

FIG. 8*c* represents a further development of the antenna system illustrated in FIG. 8*b*. The oscillation circuit formed in FIG. 8*b* by the inductance La3 and the capacitor Ca3 has been replaced in FIG. 8*c* by a coaxial cable KK of the length $\lambda/2$ or $\lambda/4$.

FIG. 8*d* shows the equivalent circuit diagram for the antenna system represented in FIG. 1*a* or FIG. 8*c*. The inductance La1, the capacitor Ca1 and the resistor Ra1 are shown representatively for an oscillation circuit constituted by a line or by discrete components.

The third antenna A3 is preferably designed as a line conductor (leak cable) (see, for example, EP-A1-0 502 337), which can be inductively coupled to the antenna system constituted by the antennas A1, A2. In this way it is possible in connection with traffic engineering communications systems to maintain the contact between two communications units over greater distances. In FIG. 2, such a leak cable is provided on the rail base of the railroad tracks. A particularly good inductive transmission over greater distances without noticeable losses can take place by means of this arrangement.

I claim:

1. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna have a resonant frequency of at least approximately a value fm.

2. The antenna system in accordance with claim 1, wherein at least one of the first and the second antenna is provided to be inductively coupled to the at least one third antenna.

3. The antenna system in accordance with claim 1, wherein at least one of the at least one first transmitter and first receiver unit and the at least one second transmitter and second receiver is disposed at a point on a traffic route; and another one of the at least one first transmitter and first receiver unit and the at least one second transmitter and second receiver is disposed on a vehicle traveling over the traffic route.

4. The antenna system in accordance with claim 1, the first, second and the at least one third antenna having a same resonant frequency of at least approximately a value fm.

5. The antenna system in accordance with claim 1, the first, second and the at least one third antenna being tuned circuits.

6. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein at least one of the first, second and at least one third antenna have an inductivity in a shape of at least approximately an elongated electrical conductor having ends connected with a capacitance.

7. The antenna system in accordance with claim 3, wherein the inductivity and the capacitance are provided by one of individually and parallel placed wires, coaxial conductors and metal strips arranged on a plate.

8. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein the at least one third antenna is coupled to one of the first and second antenna via a coupling coil.

9. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein the inductivities of the first and second antennas are approximately vertical with respect to each other.

10. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein distances between inductivities of the first and second antennas are selected such that a passband curve of an oscillation system formed by the first, second and at least one third antenna has a data transmission bandwidth.

11. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein one of the first, second and the third antenna is adapted to be coupled to at least one further antenna to provide increased bandwidth.

12. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein an inductivity of one of the first, second and third antenna is disposed above an electrically conducting plate, and a ferrite element is provided between the inductivity and the plate.

13. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein one of the antennas is coupled with a rectifier unit for current supply.

14. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein at least one of the antennas is constituted by a coaxial line.

15. The antenna system in accordance with claim 14, wherein the length of the coaxial line is selected so that an occurring resonance frequency corresponds at least approximately to a value fm.

16. The antenna system in accordance with claim 14, wherein the coaxial line is shielded against effects of electrical fields.

17. The antenna system in accordance with claim 16, wherein the coaxial line is divided into cable elements having shielding connected with ground, so that the coaxial line is shielded against electrical fields so as to avoid impairment of the magnetic field.

18. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein the at least one third antenna is one of a line conductor and leak cable adapted to be coupled to the antenna system formed by the first and second antenna.

19. The antenna system in accordance with claim 18, wherein the line conductor is arranged in a rail base of railroad tracks.

20. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein the inductivities of the first and second antennas are approximately in one horizontal plane.

21. An antenna system comprising:

a first antenna connected with at least one of a first transmitter and first receiver unit;

a second antenna which is inductively and mechanically coupled via the first antenna with said at least one of the first transmitter and first receiver unit;

the mutually inductive and mechanically coupled antennas being coupled with a further antenna system having at least one third antenna connected with at least one of a second transmitter and second receiver unit for at least one of the transmission of data and for the reception of data from said at least one of the first transmitter and first receiver unit; and the first, second and at least one third antenna having a resonant frequency of at least approximately a value fm, wherein the third antenna is adapted to be coupled to at least one further antenna to provide increased bandwith.

* * * * *